United States Patent
Velasco

(10) Patent No.: US 6,446,075 B1
(45) Date of Patent: Sep. 3, 2002

(54) SYSTEM AND METHOD FOR AUTOMATICALLY SYNCHRONIZING DIFFERENT CLASSES OF DATABASES UTILIZING A REPOSITORY DATABASE

(75) Inventor: Gabriel Velasco, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/030,257

(22) Filed: Feb. 25, 1998

(51) Int. Cl.[7] ............................................... G06F 17/30
(52) U.S. Cl. ........................................ 707/102; 707/200
(58) Field of Search ..................................... 707/1–206

(56) References Cited

U.S. PATENT DOCUMENTS

| | | | | |
|---|---|---|---|---|
| 5,497,491 A | * | 3/1996 | Mitchell et al. | 709/303 |
| 5,758,083 A | * | 5/1998 | Singh et al. | 707/100 |
| 5,765,172 A | * | 6/1998 | Fox | 707/204 |
| 5,806,066 A | * | 9/1998 | Golshani et al. | 707/100 |
| 5,884,325 A | * | 3/1999 | Bauer et al. | 707/201 |
| 5,937,409 A | * | 8/1999 | Wetherbee | 707/103 |
| 5,970,490 A | * | 10/1999 | Morgenstern | 707/10 |
| 6,195,662 B1 | * | 2/2001 | Ellis et al. | 707/103 |
| 6,236,997 B1 | * | 5/2001 | Bodamer et al. | 707/10 |

* cited by examiner

Primary Examiner—Maria N. Von Buhr
(74) Attorney, Agent, or Firm—Sawyer Law Group LLP

(57) ABSTRACT

A system and method for synchronizing a first database and a second database is disclosed. The first database is of a first class, while the second database is of a second class. The method and system include providing a repository database for storing metadata regarding the first database and the second database, automatically generating the first database using a first portion of the metadata and automatically generating the second database using a second portion of the metadata. The method and system further include automatically generating a mapping between the first database and the second database using a third portion of the metadata stored in the repository database.

28 Claims, 5 Drawing Sheets

SYSTEM AND METHOD FOR AUTOMATICALLY SYNCHRONIZING DIFFERENT CLASSES OF DATABASES UTILIZING A REPOSITORY DATABASE

FIELD OF THE INVENTION

The present invention relates to different databases and more particularly to a method and system for automatically synchronizing different classes of databases.

BACKGROUND OF THE INVENTION

There are different classes of conventional databases. One class of databases is relational databases, such as DB/2 databases. Relational databases are made up of tables containing columns and rows. One table in a relational database can be related to another table using a pointer. The pointer at one entry in the first table relates the two tables by pointing to an entry in the second table. Relational databases are useful in part because they are capable of efficiently storing large amounts of information without requiring redundancies. Conventional relational databases may also serve as repository databases, which contain metadata describing a particular database. In the context of this application, metadata is information describing the structure of a database.

A second class of databases is document oriented databases, for example LOTUS NOTES databases. Document oriented databases consist of collections of documents which may or may not be related. Each document in the database can contain several fields. Document oriented databases are useful for storing freeform data and may serve as repositories which contain metadata describing the structure of a particular database.

It is sometimes useful to store the same information in two classes of databases. The two databases are known as a front end database and a back end database. The front end database may be a document oriented database, such as a LOTUS NOTES database. The back end database may be a relational database, such as DB/2. Using these conventional databases a user can take information in a nonrelational database that is of interest and efficiently store the information in a relational database.

Because two different classes of databases are being used to store the same information, it is desirable to synchronize the front end and back end databases. Synchronization of two databases is achieved through a map between the databases. The map allows a user to input data into one database and generates the information in the corresponding location in the second database. Thus, when databases are synchronized, a user can edit the data stored in one database and have the edits also appear in the second database.

A conventional method for synchronizing a front end database and a back end database requires a user to manually perform several steps of the synchronization. For example, one conventional mechanism for synchronizing databases is a product known as NOTES PUMP. NOTES PUMP allows a user to synchronize a LOTUS NOTES database and a DB/2 database by setting a one-to-one correspondence between the forms and fields in a predefined front end database and the tables and columns in a predefined back end database. NOTES PUMP can then move data between the front end database into the back end relational database.

Although NOTES PUMP is capable of synchronizing the data in preexisting databases, NOTES PUMP requires the user to perform several operations. A portion of each phase of synchronizing the front end and back end databases is carried out manually. If there are several structures that must be mapped, the user must specify the one-to-one correspondence for each structure manually. If the user later makes changes in the structure of one database, the user must also indicate the changes in the mechanism for synchronizing the databases and in the other database. Consequently, conventional methods and mechanisms for synchronizing two classes of databases are relatively time consuming and prone to error.

Accordingly, what is needed is a system and method for synchronizing different classes of databases without requiring significant user input. The present invention addresses such a need.

SUMMARY OF THE INVENTION

The present invention provides a method and system for synchronizing a first database and a second database. The first database is of a first class, while the second database is of a second class. In one aspect, the method and system comprise providing a repository database for storing metadata regarding the first database and the second database, automatically generating the first database using a first portion of the metadata, and automatically generating the second database using a second portion of the metadata. The method and system further comprise automatically generating a mapping between the first database and the second database using a third portion of the metadata stored in the repository database. In a second aspect, the first database is a preexisting database. In this aspect, the method and system include providing a repository database for storing metadata regarding the first database and the second database and automatically generating the second database using a first portion of the metadata. In this aspect, the method and system further comprise automatically generating a mapping between the first database and the second database using a second portion of the metadata stored in the repository database.

According to the system and method disclosed herein, the present invention allows a user to easily store and manipulate information in two databases of different classes, thereby decreasing development time and maintenance effort.

DETAILED DESCRIPTION OF THE INVENTION

The present invention relates to an improvement in different databases. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
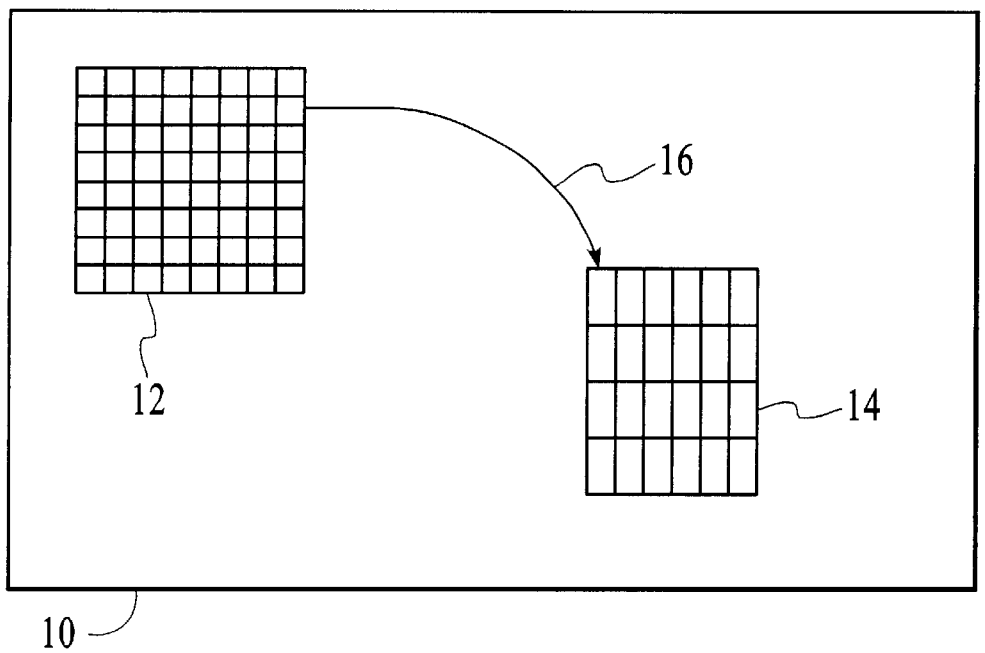
FIG. 1 is a block diagram of a relational database.

Different classes of conventional databases can be used for storing information. FIG. 1 depicts a database 10 belonging to one particular class known as relational databases. The relational database 10 is made up of tables 12, and 14. Each table 12 and 14 contains columns and rows. A first table 12 in the relational database 10 can be related to the second table 14 in the relational database 10 using a pointer 16. For example, the pointer 16 at one entry in the first table 12 can point to an entry in the second table 14. One example of a conventional relational database is a DB/2 database.

Relational databases are capable of storing large amounts of information without requiring redundancies. An entry in one table 12 of the relational database 10 can be related to an entry in another table 14 by the pointer 16. This feature allows a user to draw the desired connections between data stored in the relational database 10. Thus, the relational database 10 can clearly indicate the real-world relationship between the entries. When these relationships are indicated using pointers, redundant data for different entries need not be stored. Instead, the pointer 16 can be used. Redundancies are thereby reduced. Because redundancy can be eliminated, relational databases are more efficient than other classes of databases for some types of data.

Figure 2:
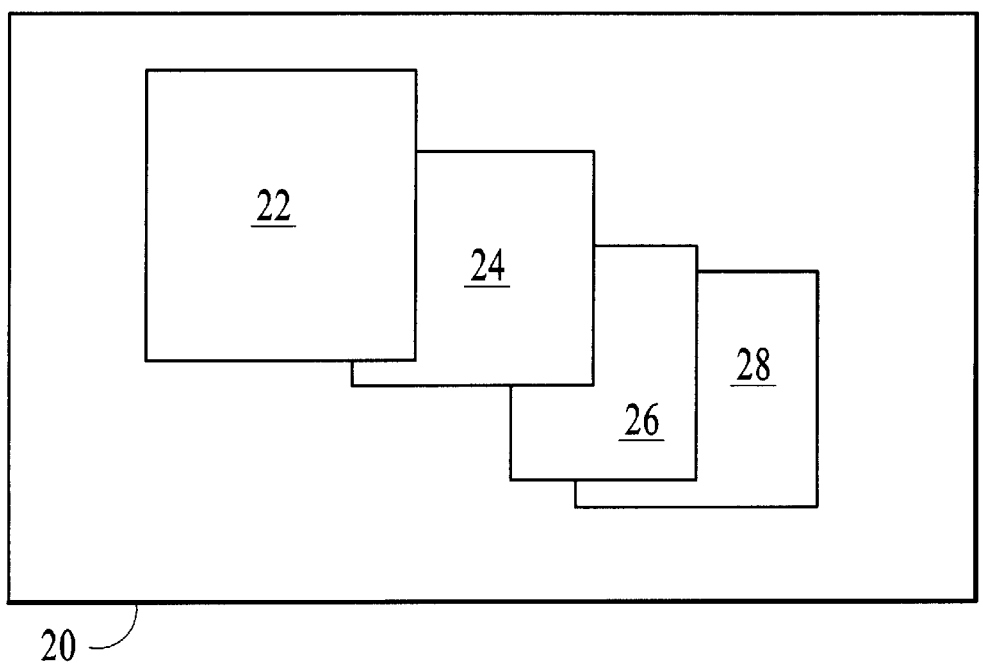
FIG. 2 is a block diagram depicting a document oriented database.

FIG. 2 depicts a database 20 belonging to a second class of databases, document oriented databases. Document oriented databases are nonrelational. The document oriented database 20 contains documents 22, 24, 26, and 28, otherwise known as forms, that are related hierarchically, in a chain. For example, the document 22 is a child of the document 24. The documents 26 and 28 are known as the parent and grandparent of the document 24. Each document 22, 24, 26, and 28 in the hierarchy can contain several fields. An example of a document oriented database is a LOTUS NOTES database.

Although the document oriented database 20 typically does not eliminate redundancies, document oriented databases are still very useful and can be more appropriate for some applications. For example, the world wide web contains documents called pages. Pages can be related to other pages in a hierarchical way using hypertext links. The word wide web is essentially a very large to document oriented database. Thus, users downloading data from or uploading pages to the world wide web are utilizing a document oriented database.

Currently, there is also a trend towards utilizing two databases of different classes. For example, current conventional applications can utilize a front end database and a back end database. The front end database might be a document oriented database, such as a LOTUS NOTES database. The back end database may be a relational database, such as DB/2. These databases can be used to store the same information in different ways. Thus, a user can store data from the front end document oriented database more efficiently in the back end relational database.

For example, through LOTUS NOTES, a user can describe and create the forms and fields of a front end, document oriented LOTUS NOTES database. Information can be stored in this front end LOTUS NOTES database. LOTUS NOTES also allows a user to describe the tables and columns of a DB/2 database. The information in the front end database can also be stored in this back end DB/2 database. Because two different classes of databases are being used to store the same information, it is desirable to synchronize the front end and back end databases. Synchronizing two databases provides a map between the databases, allowing a user to input data into one database and generating the same data in the corresponding location in the second database.

A conventional method for synchronizing a front end database and a back end database manually synchronizes the databases. For example, an existing mechanism for synchronizing databases, NOTES PUMP, allows a user to synchronize a LOTUS NOTES database and a relational database, such as a DB/2 database that have been created using LOTUS NOTES. NOTES PUMP allows a user to specify that a particular form and field of a predefined front end LOTUS NOTES database correspond to a particular table and column within a previously defined back end relational database. Thus, NOTES PUMP allows a user to set a one-to-one correspondence between the entries in the predefined front end and back end databases. NOTES PUMP can then move data from the front end database into the back end relational database. Similarly, once this correspondence is set, NOTES PUMP can move data from the back end database to the front end relational database.

Figure 3:
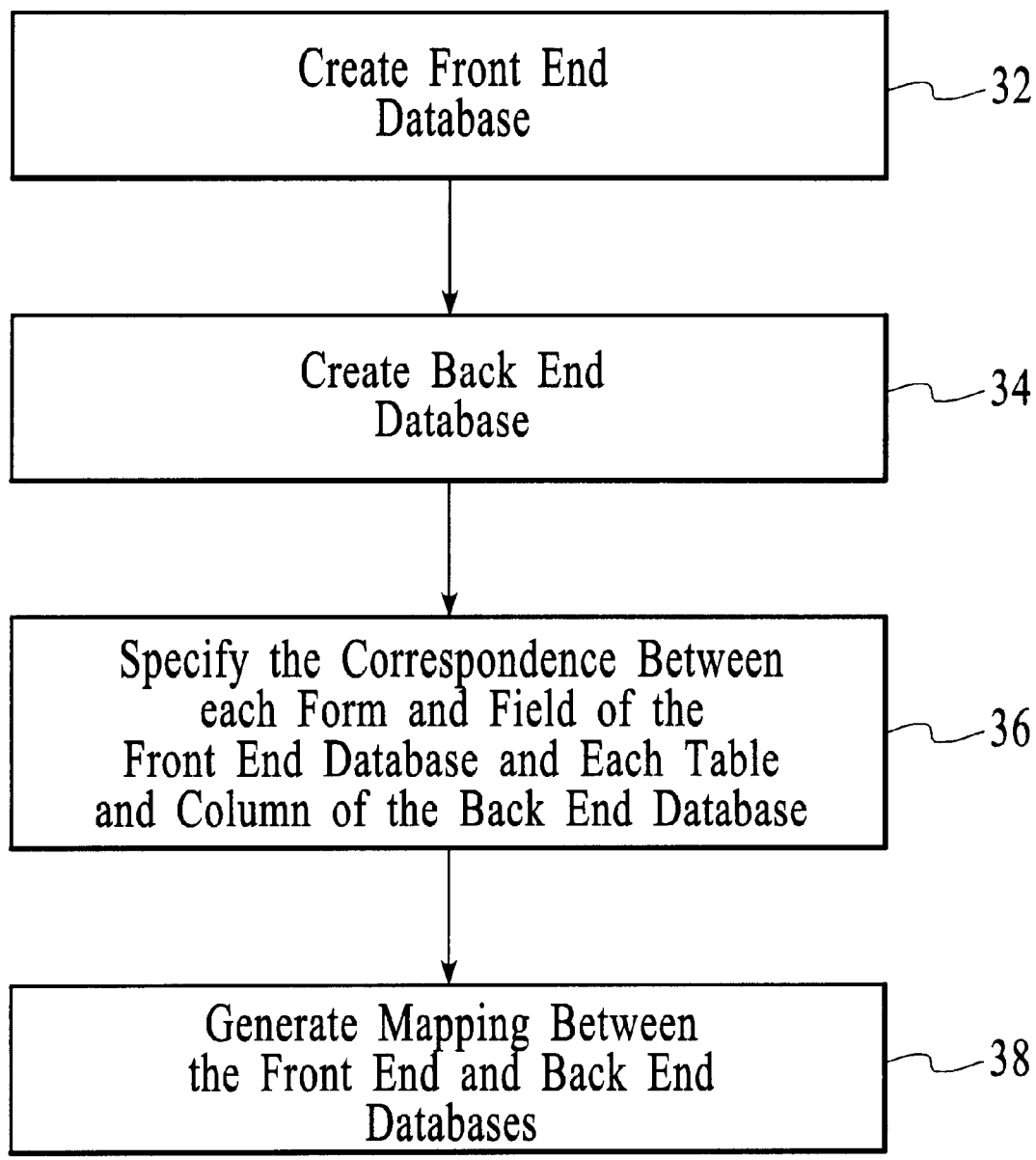
FIG. 3 is a flow chart depicting a conventional method for synchronizing databases of different classes.

Although conventional methods of synchronizing databases, such as NOTES PUMP, are capable of synchronizing the data in preexisting databases, one of ordinary skill in the art will recognize that NOTES PUMP requires a great deal of user input. Each phase of synchronizing the front end and back end databases must be carried out separately. FIG. 3 depicts a conventional method 30 for providing synchronized databases. First, the user defines the front end database via step 32. Where the front end database is a document oriented database, step 32 typically includes defining the characteristics of the forms and fields of the front end database. The user then defines the back end database via step 34. Where the back end database is a relational database, step 34 typically includes defining the characteristics of each table and column of the back end database.

Via step 36, the user then manually specifies which form and field of the oriented database are related to a particular table and column of the relational database. If the user later makes changes in the characteristics field, form, table, or column the user must also indicate the changes either in the mechanism for synchronizing the databases (i.e. NOTES PUMP) or in the database to which data is being mapped. The user is, therefore, still required to make changes in multiple locations to ensure that the front end and back end databases remain synchronized. Once the one-to-one correspondence has been set in step 36, NOTES PUMP generates the mapping between the front end and back end databases via step 38. As a result, data in the front end database can be efficiently stored in the back end relational database.

Although the method for synchronizing databases shown in FIG. 3 functions, those with ordinary skill in the art will realize that the user is obligated to perform several operations in order to ensure that the databases can be synchronized. Moreover, the user must also perform additional operations to ensure that the databases remain synchronized after the user subsequently makes changes to the characteristics of a database.

Several phases of synchronizing the front end and back end databases must be carried out manually. The user performs steps 32, 34, and 36 of the conventional method 30. If there are several forms in the relational database, the user must perform step 36, inputting the correspondence between the front and back end databases, for each form in the relational database. If the user later makes changes in the characteristics of the form or field in the document oriented database, the user must also indicate the changes either in the mechanism for synchronizing the databases (i.e. NOTES PUMP) or in the relational database. Similarly, if the user makes changes in the characteristics of the table or column in the relational database, the user must also indicate the changes in NOTES PUMP or in the document oriented database. For example, if a particular column currently stores up to fifteen characters and the user changes the column to be capable of storing twenty characters, the user must indicate this change in both the database and NOTES PUMP. Consequently, conventional methods and mechanisms for synchronizing two classes of databases are relatively difficult for a user to utilize.

The present invention provides for a method and system for synchronizing databases of different classes. The present invention will be described in terms of synchronizing document oriented and relational databases. The present invention will also be described in terms of specific databases, such as LOTUS NOTES and DB/2, as well as a specific mapping mechanism, such as NOTES PUMP. However, one of ordinary skill in the art will readily recognize that this method and system will operate effectively for other classes of databases, other databases and other mapping mechanisms.

Figure 4:
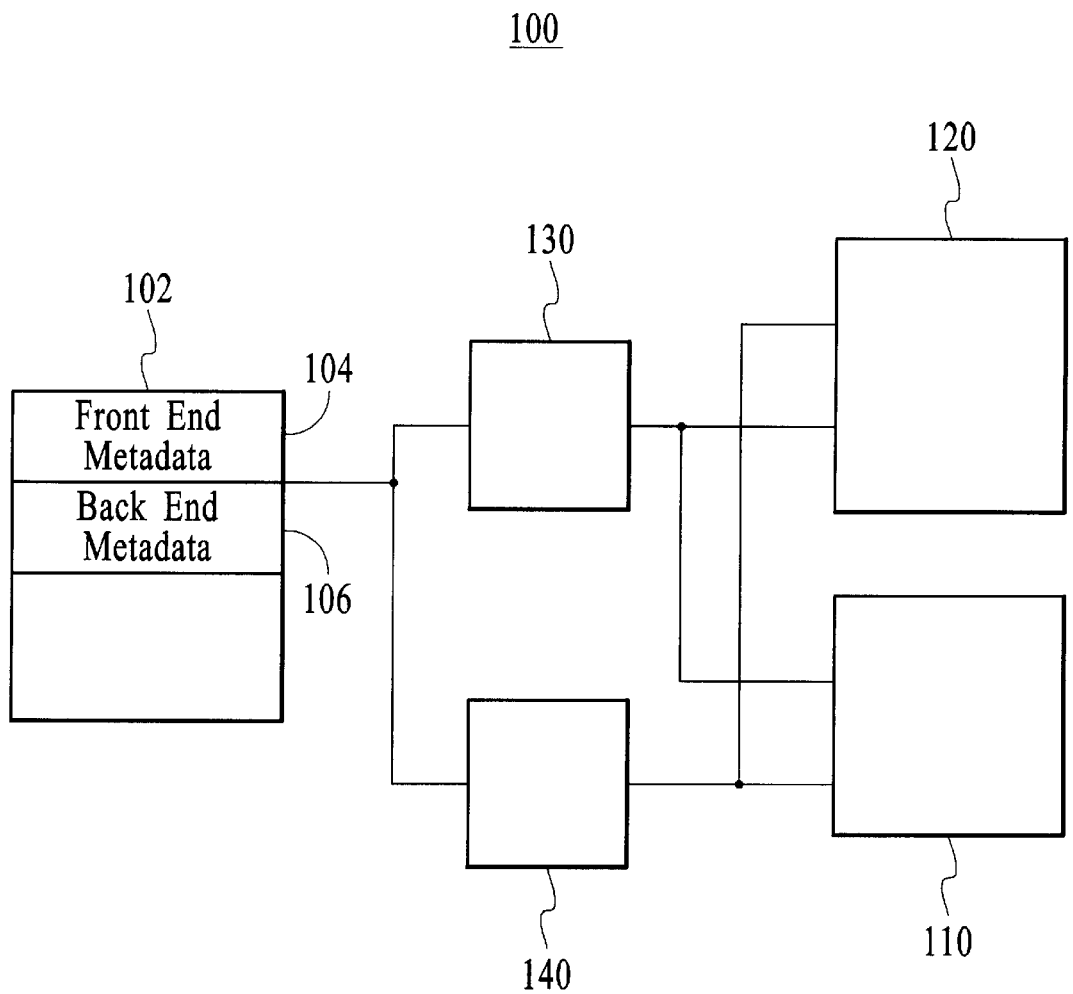
FIG. 4 is a block diagram of a system for synchronizing databases of different classes in accordance with the present invention.

To more particularly illustrate the method and system in accordance with the present invention, refer now to FIG. 4 depicting a block diagram of one embodiment 100 of such a system. The system 100 in accordance with the present invention includes a repository database 102, a front end database 110, a back end database 120, a mechanism 130 for generating the databases, and a mechanism 140 for generating the mapping between the databases. Note that although a two mechanisms 130 and 140 for generating the databases and the mapping are depicted, nothing prevents combining the generation of the databases and the mapping of the databases 110 and 120 into a single mechanism.

The repository database 102 includes metadata 104 relating to the front end database 110 and metadata 106 relating to the back end database 120. The front end database 110 and the back end database 120 are preferably of different types. In one embodiment, the front end database 110 is a nonrelational database such as a document oriented database and the back end database 120 is a relational database. In a preferred embodiment, the front end database 110 is a LOTUS NOTES database while the back end database 120 is a DB/2 database.

In one embodiment, the mechanism for generating the databases 130 includes a plurality of Application Program Interfaces ("APIs"). In a preferred embodiment, the APIs generate the front end database 110. Also in a preferred embodiment, the back end database 120 is generated using a data definition language ("DDL").

Figure 5:
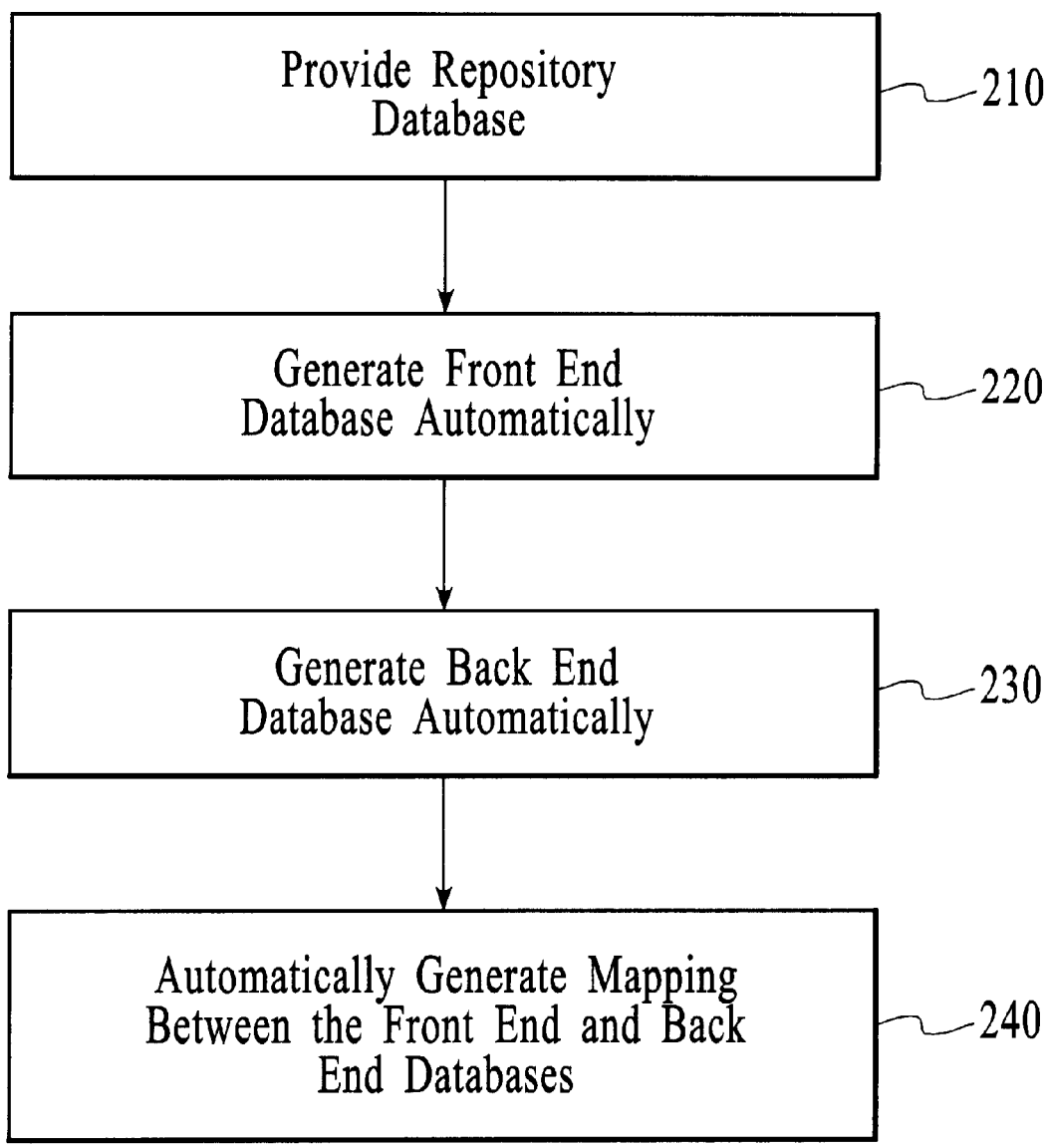
FIG. 5 is a flow chart depicting a method for synchronizing databases of different classes in accordance present invention.

FIG. 5 depicts a method 200 for synchronizing databases of different classes in accordance with the present invention. The repository database 102 is first provided via step 210. The repository database 102 contains metadata relating to both the front end database 110 and the back end database 120.

Once a user has provided the metadata 104 relating to the front end database 110, the front end database 110 can be automatically created in step 220. In a preferred embodiment, step 220 is performed by APIs in the mechanism 130 which generate the DDL describing the front end database 110. In the preferred embodiment, generation of the front end database 110 entails creating and describing each of the forms and fields in the front end database 110.

Once a user has provided the metadata 106 relating to the back end database 120, the back end database 120 can automatically created via step 230. In a preferred embodiment, step 230 is performed by APIs in the mechanism 130 which generate the DDL describing the back end database 120. In the preferred embodiment, generation of the back end database 110 entails creating and describing each of the tables and columns in the back end database 120.

The mapping between the front end database 110 and the back end database 120 is then automatically generated via step 240. In one embodiment, the mapping maps the basic structures of one database to the other database. In a preferred embodiment, step 240 is performed by using NOTES PUMP to automatically generate the mapping between the front end database 110 and the back end database 120. This mapping is created from the repository database 102. NOTES PUMP utilizes a LOTUS NOTES document in order to create the mapping. Consequently, in a preferred embodiment, once a LOTUS NOTES repository database 102 including metadata 104 and 106 relating to both the front end database 110 and the back end database 120 is created, NOTES PUMP can relatively easily create the mapping between the front end database 110 and the back end database 120.

Through the use of the repository database 102, the method 200 can automatically generate both the front end and back end databases. In addition, the metadata 102 and 104 for the front and back end databases 110 and 130, respectively, are in a single location from which the map is generated. As a result, changes in the characteristics of features of the front and back end databases 110 and 130 need only be made in the repository database 102. The mapping mechanism 140 automatically updates the characteristics of both the databases 110 and 120. Consequently, in contrast to conventional methods for synchronizing different classes of databases, a user need not update multiple locations in order to ensure that a change made to one of the databases 110 or 120 is reflected in the other database 110 or 120.

Figure 6:
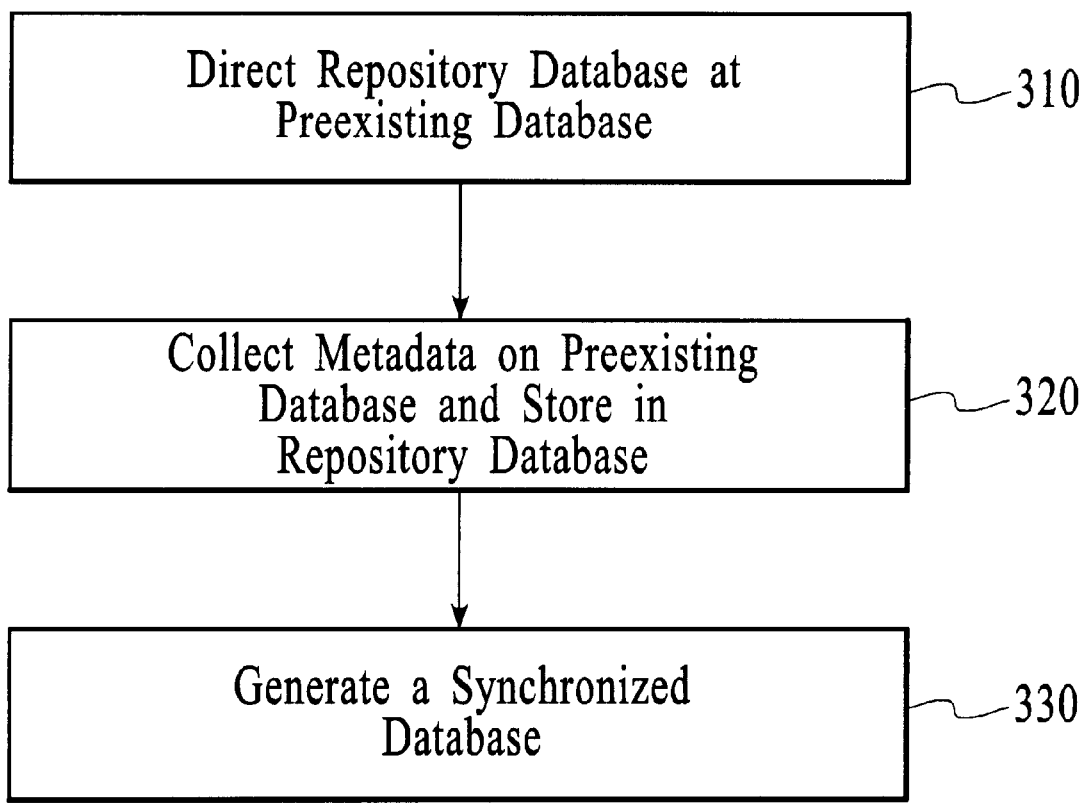
FIG. 6 is a flow chart depicting a method for synchronizing a database with a preexisting database of a different class in accordance with the present invention.

The present invention can also be used in conjunction with preexisting databases. FIG. 6 depicts a method 300 in accordance with the present invention for synchronizing a new database with a preexisting database. The user first directs the repository database 102 toward an already existing database, for example the relational database 120, via step 310. Metadata is collected for the relational database 120 and stored in the repository database 102 via step 320. The steps 310 and 320 could be performed in a variety of ways. For example, the user could manually import the metadata describing the preexisting database. In another embodiment, the application being used could automatically import the information. In another embodiment, APIs could be used to extract the information relating to the preexisting database.

This method is particularly useful for creating the document oriented database 110 from the relational database 120 because relational databases are described using a table within the relational database 120. The repository database can, therefore, obtain the metadata 104 for the relational database 110 from this table, typically known as a system catalog ("syscat") table. Based on the metadata 104 for the relational database 120, a working front end document oriented database 110 is generated via step 330. In one embodiment, the front end database 110 is created by taking a basic structure of the back end database 120, such as a table in a relational database, and creating a corresponding structure in the front end database, such as a form in a document oriented database. Once the working front end database 110 is generated, the user could further customize the front end database 110 to meet the user's preferences. Because the front end database 110 was generated from the metadata for the relational database 120, the document oriented database 110 is synchronized with the relational database 120.

A method and system has been disclosed for automatically synchronizing databases of different types. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for synchronizing a first database of a first class and a second database of a second class comprising the steps of:
    (a) providing a repository database for storing metadata regarding the first database and the second database wherein the first database is of a different type than the second database and metadata comprises information describing the structure of a database;
    (b) automatically generating the first database using a first portion of the metadata;
    (c) automatically generating the second database using a second portion of the metadata; and
    (d) automatically generating a mapping between the first database and the second database using a third portion of the metadata stored in the repository database.

2. The method of claim 1 wherein the repository database providing step (a) further comprises the steps of:
    (a1) providing the first portion of metadata relating to the first database; and
    (a2) providing the second portion of metadata relating to the second database.

3. The method of claim 2 wherein the first database is a document oriented database; and
    the second database is a relational database.

4. The method of claim 3 wherein the first database generating step (b) further comprises the step of:
    (b1) utilizing a plurality of Application Program Interfaces (APIs) to create the document oriented database.

5. The method of claim 4 wherein the second database generating step (c) further comprises the step of:
    (c1) utilizing a data definition language (DDL) to create the relational database.

6. A method for synchronizing a first database of a first class and a second database of a second class, the first database being a preexisting database, the method comprising the steps of:
    (a) providing a repository database for storing metadata regarding the first database and the second database wherein the first database is of a different type than the second database and metadata comprises information describing the structure of a database;
    (b) automatically generating the second database using a first portion of the metadata; and
    (c) automatically generating a mapping between the first database and the second database using a second portion of the metadata stored in the repository database.

7. The method of claim 6 wherein the repository database providing step (a) further comprises the step of:
    (a1) automatically collecting the first portion of metadata.

8. The method of claim 7 wherein the second database generating step (b) further comprises the step of:
    (b1) creating the second database using the repository database and the first portion of metadata relating to the second database.

9. The method of claim 8 wherein the first database is a document oriented database; and
    the second database is a relational database.

10. The method of claim 9 wherein the first database is a relational database; and
    the second database is a document oriented database.

11. A system for synchronizing a first database of a first class and a second database of a second class comprising:
    a repository database for storing metadata regarding the first database and the second database wherein the first database is of a different type than the second database and metadata comprises information describing the structure of a database;
    means for automatically generating the first database using a first portion of the metadata, automatically generating the second database using a second portion of the metadata; and
    means for automatically generating a mapping between the first database and the second database using a third portion of the metadata stored in the repository database.

12. The system of claim 11 wherein the first database is a document oriented database; and
    the second database is a relational database.

13. The system of claim 12 wherein the means for automatically generating the first database and the second database further include:
    a plurality of Application Program Interfaces (APIs) for creating the first and second databases.

14. The system of claim 13 wherein the means for automatically generating the first database and the second database further include:
    a data definition language (DDL) for creating the relational database.

15. A system for synchronizing a first database of a first class and a second database of a second class, the first database being a preexisting database, the system comprising:
    a repository database for storing metadata regarding the first database and the second database wherein the first database is of a different type than the second database and metadata comprises information describing the structure of a database;
    means for automatically generating the second database using a first portion of the metadata; and
    means for automatically generating a mapping between the first database and the second database using a second portion of the metadata stored in the repository database.

16. The system of claim 15 wherein the means for generating the second database further comprise:

means for creating the second database using the repository database and the first portion of metadata relating to the second database.

17. The system of claim 16 wherein the first database is a document oriented database; and the second database is a relational database.

18. The system of claim 16 wherein the first database is a relational database; and the second database is a document oriented database.

19. A computer-readable medium including a program for synchronizing a first database and a second database, the program containing instructions for:

providing a repository database for storing metadata regarding the first database and the second database wherein the first database is of a different type than the second database and metadata comprises information describing the structure of a database;

automatically generating the first database using a first portion of the metadata;

automatically generating the second database using a second portion of the metadata; and automatically generating a mapping between the first database and the second database using a third portion of the metadata stored in the repository database.

20. The computer-readable medium of claim 19 wherein the instruction for providing a repository database further comprises instructions for:

allowing a user to provide a first set of metadata relating to the first database; and allowing the user to provide a second set of metadata relating to the second database.

21. The computer-readable medium of claim 20 wherein the first database is a document oriented database; and the second database is a relational database.

22. The computer-readable medium of claim 21 wherein the instruction for generating the first database further comprises:

a plurality of Application Program Interfaces (APIs) for creating the document oriented database.

23. The computer-readable medium of claim 22 wherein the instruction for generating the second database further comprises:

a data definition language (DDL) for creating the relational database.

24. A computer-readable medium including a program for synchronizing a first database and a second database, the first database being a preexisting database, the program containing instructions for:

providing a repository database for storing metadata regarding the first database and the second database wherein the first database is of a different type than the second database and metadata comprises information describing the structure of a database;

automatically generating the second database using a first portion of the metadata; and automatically generating a mapping between the first database and the second database using a second portion of the metadata stored in the repository database.

25. The computer-readable medium of claim 24 wherein the instruction for providing the repository database comprises an instruction for:

automatically collecting the first portion of metadata.

26. The computer-readable medium of claim 25 wherein the instruction for generating the second database further comprises an instruction for:

creating the second database using the repository database and the first portion of metadata relating to the second database.

27. The computer-readable medium of claim 26 wherein the first database is a document oriented database; and the second database is a relational database.

28. The computer-readable medium of claim 27 wherein the first database is a relational database; and the second database is a document oriented database.

* * * * *